(12) United States Patent
Oumi

(10) Patent No.: US 9,470,515 B2
(45) Date of Patent: Oct. 18, 2016

(54) ARRANGEMENT EVALUATION APPARATUS FOR EVALUATING ARRANGEMENT POSITION OF RANGE SENSOR

(71) Applicant: FANUC CORPORATION, Yamanashi (JP)

(72) Inventor: Tatsuya Oumi, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 2 days.

(21) Appl. No.: 14/699,495

(22) Filed: Apr. 29, 2015

(65) Prior Publication Data

US 2015/0323321 A1 Nov. 12, 2015

(30) Foreign Application Priority Data

May 12, 2014 (JP) .................................. 2014-098802

(51) Int. Cl.
*G01B 11/25* (2006.01)
*G01C 11/02* (2006.01)
(Continued)

(52) U.S. Cl.
CPC .............. *G01B 11/25* (2013.01); *B25J 9/1697* (2013.01); *B25J 19/023* (2013.01); *G01C 11/02* (2013.01); *G06T 7/0044* (2013.01); *G06T 7/0046* (2013.01); *H04N 5/2256* (2013.01); *H04N 5/23212* (2013.01); *H04N 5/247* (2013.01); *H04N 7/181* (2013.01); *B25J 9/1666* (2013.01);
(Continued)

(58) Field of Classification Search
CPC .. G01C 11/02; H04N 5/247; H04N 5/23212; H04N 5/2256; H04N 7/181; B25J 9/1697; B25J 9/1669; B25J 9/1671; B25J 9/1666; G05B 2219/40053; G06T 7/0046
See application file for complete search history.

(56) References Cited

U.S. PATENT DOCUMENTS 7,202,957 B2 * 4/2007 Ban ........................ G01B 11/25
356/603
7,313,464 B1 * 12/2007 Perreault ................ B25J 9/1666
318/568.1

(Continued)

FOREIGN PATENT DOCUMENTS

CN 1244250 A 2/2000
CN 101680752 A 3/2010

(Continued)

OTHER PUBLICATIONS

Untranslated Notification of Reasons for Refusal for JP Application No. 2014-098802, dated Jul. 14, 2015, 2 pages.

(Continued)

*Primary Examiner* — Joseph Ustaris
*Assistant Examiner* — Jill Sechser
(74) *Attorney, Agent, or Firm* — Fredrikson & Byron, P.A.

(57) ABSTRACT

An arrangement evaluation apparatus of a range sensor comprises an article arrangement unit which arranges an article model, a sensor arrangement unit which arranges a sensor model, a first plane group generation unit which generates a plurality of first planes including division lines obtained by dividing a virtual plane, a second plane group generation unit which generates a plurality of second planes by boundary surfaces of stripe pattern light projected from the projector model, an intersection line calculation unit which calculates intersection lines between the first planes and the second planes, and an intersection number calculation unit which counts the number of intersection points between the intersection lines and the surface of the article model.

6 Claims, 14 Drawing Sheets

(51) Int. Cl.

| | |
|---|---|
| *H04N 5/247* | (2006.01) |
| *H04N 5/232* | (2006.01) |
| *H04N 5/225* | (2006.01) |
| *H04N 7/18* | (2006.01) |
| *G06T 7/00* | (2006.01) |
| *B25J 19/02* | (2006.01) |
| *B25J 9/16* | (2006.01) |

(52) U.S. Cl.
CPC ............ *B25J 9/1669* (2013.01); *B25J 9/1671* (2013.01); *G05B 2219/40053* (2013.01); *G06T 2200/04* (2013.01)

(56) References Cited

U.S. PATENT DOCUMENTS

| | | |
|---|---|---|
| 2007/0213874 A1 | 9/2007 | Oumi et al. |
| 2007/0282485 A1 | 12/2007 | Nagatsuka et al. |
| 2009/0040532 A1 | 2/2009 | Kawasaki et al. |
| 2012/0316820 A1 | 12/2012 | Nakazato et al. |
| 2013/0114861 A1* | 5/2013 | Takizawa ............ G06T 7/0044 382/106 |
| 2013/0335751 A1* | 12/2013 | Hirota .................. G01B 11/14 356/623 |
| 2014/0067317 A1* | 3/2014 | Kobayashi ............ B25J 9/1697 702/153 |

FOREIGN PATENT DOCUMENTS

| | | |
|---|---|---|
| CN | 103568024 A | 2/2014 |
| DE | 19525561 A1 | 1/1996 |
| JP | 2012063310 A | 3/2012 |
| JP | 2013101045 A | 5/2013 |
| WO | 2006013635 A1 | 2/2006 |

OTHER PUBLICATIONS

Translated Notification of Reasons for Refusal for JP Application No. 2014-098802, dated Jul. 14, 2015, 2 pages.
English Abstract and Machine Translation for German Publication No. 19525561, published Jan. 25, 1996, 10 pgs.
English Abstract for Chinese Publication No. 103568024 A, published Feb. 12, 2014, 1 pg.
English Abstract for Japanese Publication No. 2012-063310 A, published Mar. 28, 2012, 1 pg.
English Abstract for Chinese Publication No. 101680752 A, published Mar. 24, 2010, 1 pg.
English Abstract and Machine Translation for Chinese Publication No. 1244250 A, published Feb. 9, 2000, 10 pgs.
English Abstract and Machine Translation for Japanese Publication No. 2013-101045, published May 23, 2013, 29 pgs.
English Translation of Abstract for International Publication No. WO2006/013635, publication date Feb. 9, 2006, 1 page.

* cited by examiner

ARRANGEMENT EVALUATION APPARATUS FOR EVALUATING ARRANGEMENT POSITION OF RANGE SENSOR

BACKGROUND OF THE INVENTION

1. Field of the Invention

The present invention relates to an arrangement evaluation apparatus of a range sensor which evaluates an arrangement position of the range sensor by simulation.

2. Description of Related Art

A range sensor (a range scanner) is used when acquiring a wide range of position information of articles in a three-dimensional space. There has been known an apparatus in which by using a range sensor, position information of articles stacked in a three-dimensional space are acquired, the positions and attitudes of the articles are recognized on the basis of the position information, and the recognized articles are taken out by a robot (for example, see Japanese Laid-open Patent Publication No. 2013-101045). Japanese Laid-open Patent Publication No. 2013-101045 discloses that a range sensor includes two cameras and one projector.

However, since the position of a range sensor in a three-dimensional space is conventionally determined on the basis of experience and the like of a worker, it is difficult to arrange the range sensor at an optimal position.

SUMMARY OF INVENTION

One aspect of the present invention is an arrangement evaluation apparatus of a range sensor, which evaluates by simulation an arrangement position of a range sensor having a pair of cameras and a projector for projecting stripe pattern light and includes an article arrangement unit which arranges an article model corresponding to a plurality of stacked articles in a predetermined area in a three-dimensional virtual space, a sensor arrangement unit which arranges a sensor model which is a sensor model corresponding to the range sensor and includes a pair of camera models corresponding to the pair of cameras and a projector model corresponding to the projector, in a virtual space so that the predetermined area is included in a measurement range, a first plane group generation unit which generates a plurality of first planes including a plurality of division lines obtained by dividing a virtual plane at a regular interval in the predetermined area opposing the pair of camera models and a camera sight line extending toward the respective division lines from the pair of camera models, a second plane group generation unit which generates a plurality of second planes by boundary surfaces of stripe pattern light when it is assumed that the stripe pattern light has been projected from the projector model to the virtual plane, an intersection line calculation unit which calculates a plurality of intersection lines at which the plurality of first planes and the plurality of second planes intersect each other, and an intersection number calculation unit which counts a number of intersection points between the plurality of intersection lines and a surface of the article model facing the pair of camera models.

BRIEF DESCRIPTION OF THE DRAWINGS

The object, features, and advantages of the present invention will be further apparent from a description of the following embodiments associated with the accompanying drawings, and in the accompanying drawings.

DETAILED DESCRIPTION OF THE INVENTION (First embodiment)

Hereinafter, with reference to FIG. 1 to FIG. 11, a first embodiment of the present invention will be described. The arrangement evaluation apparatus of a range sensor according to the first embodiment evaluates the propriety of an arrangement position of a range sensor in a three-dimensional space by simulation. The range sensor is used in order to acquire the position information of stacked articles when the articles are taken out by a robot.

Figure 1:
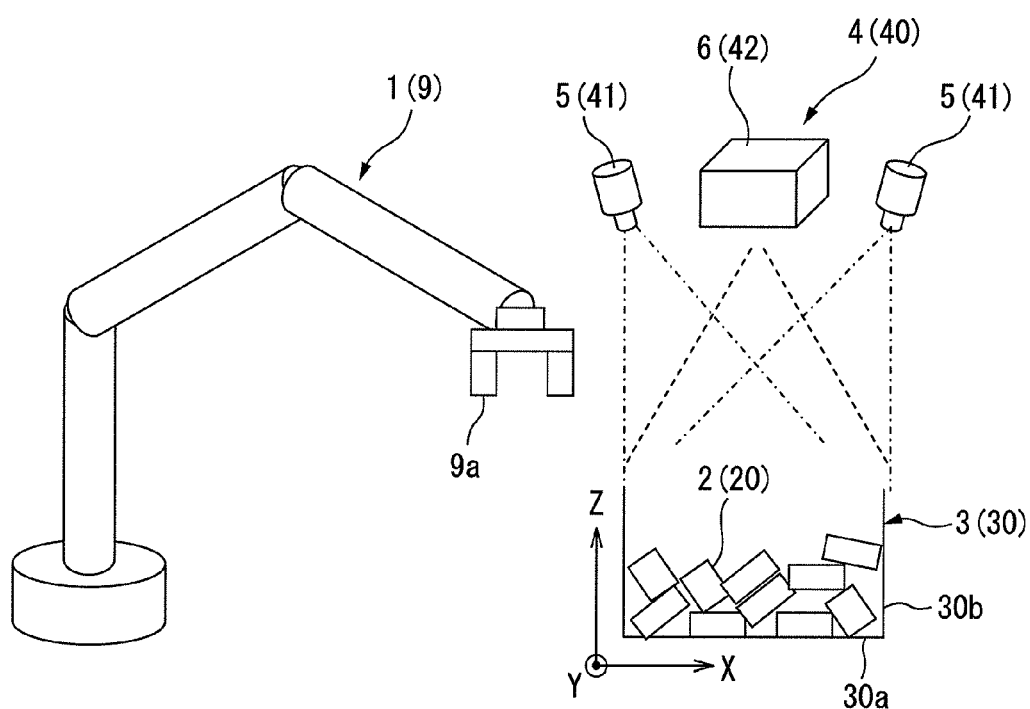
FIG. 1 is a diagram illustrating simulation models used in an arrangement evaluation apparatus of a range sensor according to a first embodiment of the present invention.

FIG. 1 schematically illustrates an entire configuration of simulation models to be subjected to simulation by an arrangement evaluation apparatus. As illustrated in FIG. 1, the simulation models include a robot model 1 obtained by modeling a robot 9, an article model 2 obtained by modeling articles 20 (work), a container unit model 3 obtained by modeling a container unit 30, and a sensor model 4 obtained by modeling a range sensor 40. The shapes of these simulation models (the robot model 1, the article model 2, the container unit model 3, and the sensor model 4) are defined in a virtual space having a coordinate system of three orthogonal axes (XYZ axes). In other words, the simulation models are three-dimensional models in a virtual space and are arranged with predetermined orientations in predetermined positions in the virtual space.

The robot 9 is an articulated robot and has a grasping unit 9a capable of grasping an article at a front end portion of an arm thereof. The container unit 30, for example, is a container with an open top, and has a bottom wall part 30a extending on X and Y planes and a side wall part 30*b* vertically extending from a peripheral edge of the bottom wall part 30*a* along the Z axis direction. The articles 20 are stacked and received in the container unit 30 and have the same rectangular parallelepiped shape.

The range sensor 40 is a distance sensor having two cameras 41 and one projector 42, wherein the cameras 41 and the projector 42 have been modeled as a camera model 5 and a projector model 6, respectively. The camera 41 is a digital video camera or a digital still camera having an imaging element such as a CCD (Charge Coupled Device) sensor and a CMOS (Complementary Metal Oxide Semiconductor) sensor, and is arranged above the container unit 30 so as to take an image of the surfaces of the articles 20. The projector 42 is arranged above the container unit 30 to project stripe pattern light in the field of view of the two cameras 41. A plurality of measurement points are set on the surfaces of the articles 20 on the basis of the pattern light, and three-dimensional position information of the measurement points, i.e., an X coordinate value, a Y coordinate value, and a Z coordinate value are acquired by the two cameras 41.

Figure 2:
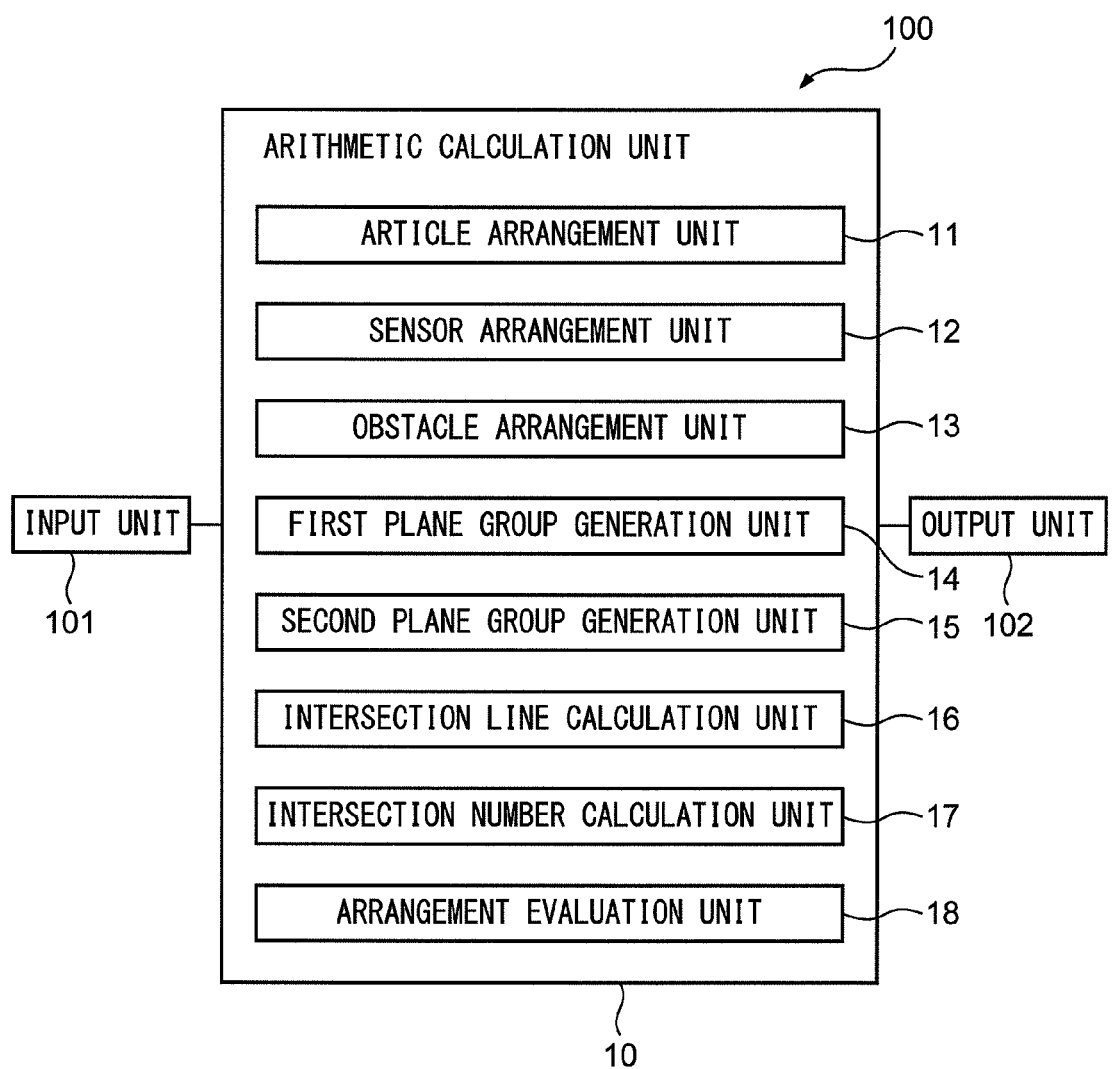
FIG. 2 is a block diagram illustrating a configuration of an arrangement evaluation apparatus of a range sensor according to a first embodiment of the present invention.

FIG. 2 is a block diagram illustrating a configuration of an arrangement evaluation apparatus 100 according to the first embodiment of the present invention. As illustrated in FIG. 2, the arrangement evaluation apparatus 100 includes an input unit 101, an output unit 102, and an arithmetic calculation unit 10. The input unit 101 inputs various commands for simulation and is configured by a keyboard and the like. The output unit 102 displays a simulation result and is configured by a display and the like. The arithmetic calculation unit 10 is configured by a computer including an arithmetic processing device having a CPU (Central Processing Unit), a ROM (Read Only Memory), a RAM (Random Access memory), other peripheral circuits and the like, and has an article arrangement unit 11, a sensor arrangement unit 12, an obstacle arrangement unit 13, a first plane group generation unit 14, a second plane group generation unit 15, an intersection line calculation unit 16, an intersection number calculation unit 17, and an arrangement evaluation unit 18 as functional elements.

Figure 3A:
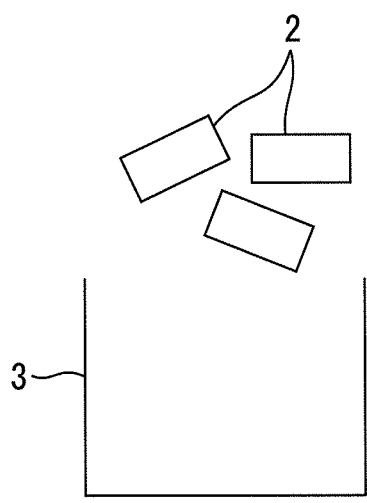
FIG. 3A and FIG. 3B are diagrams for explaining processing in an article arrangement unit of FIG. 2.
Figure 3B:
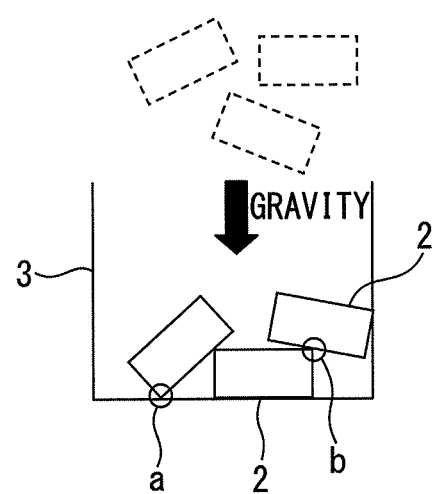

The article arrangement unit 11 arranges a plurality of article models 2 in a stacked state in the container unit model 3. FIG. 3A and FIG. 3B are diagrams for explaining processing in the article arrangement unit 11. Firstly, the article arrangement unit 11 arranges one or a plurality of three-dimensional article models 2 created by a user and having a predetermined shape in a virtual space via the input unit 101 while ignoring gravity as illustrated in FIG. 3A. Next, the article arrangement unit 11 applies gravity to the article models 2 to drop the article models 2 in the container unit model 3 as illustrated in FIG. 3B. At this time, the positions of the article models 2 are restrained at an interference point (point a of FIG. 3B) between the article model 2 and the container unit model 3 and an interference point (point b of FIG. 3B) between the article model 2 and another article model 2, so that the positions and orientations of the article models 2 in a stacked state are decided.

With reference to FIG. 1, the sensor arrangement unit 12 arranges the sensor model 4 (the camera model 5 and the projector model 6) above the container unit model 3. A measurement range of the sensor model 4 changes in response to the position of the sensor model 4 with respect to the stacked article models 2. The measurement range preferably includes all areas of the container unit model 3, and is called a needed measurement range. In the present embodiment, the sensor model 4 is arranged so that the needed measurement range falls within the fields of view of two cameral models 5 and the projection range of the projector model 6. In other words, the sensor model 4 is arranged so that all of the areas of the container unit model 3 are included in the measurement range. In this way, it is possible to measure the positions of all the article models 2 arranged in the container unit model 3.

Figure 4A:
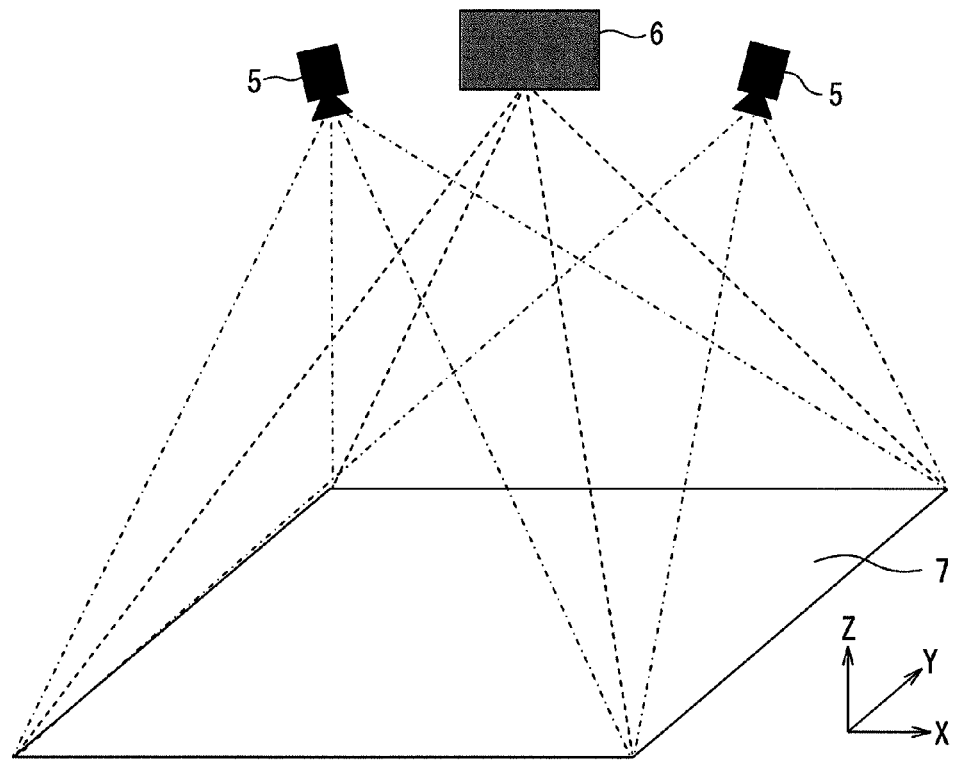
FIG. 4A and FIG. 4B are diagrams which shows one example of an arrangement of a sensor model.
Figure 4B:
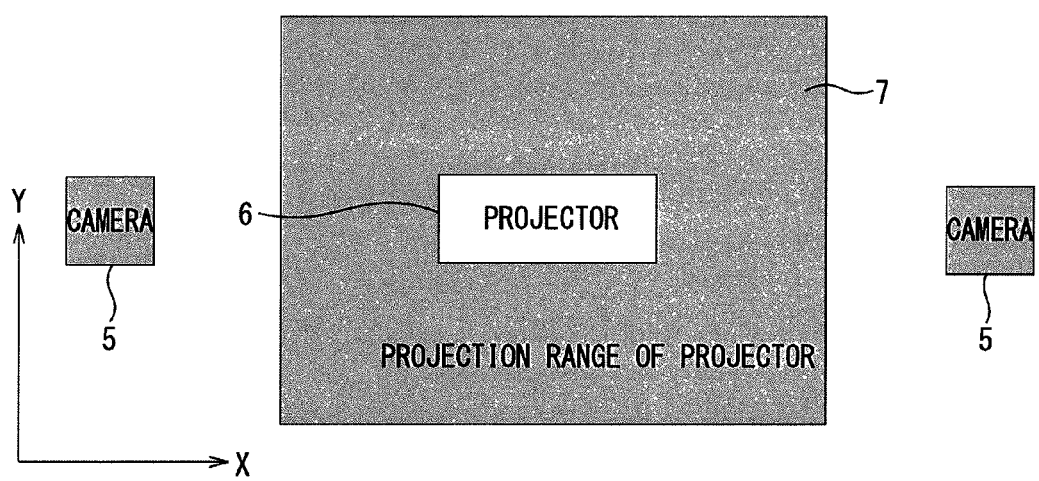

FIG. 4A and FIG. 4B are diagrams illustrating one example of the arrangement of the sensor model 4. Particularly, FIG. 4A illustrates a perspective view and FIG. 4B illustrates a plan view. In FIG. 4A and FIG. 4B, the projector model 6 is arranged above the center of the container unit model 3, and a pair of camera models 5 are symmetrically arranged at both sides of the projector model 6, wherein the projector model 6 and the pair of camera models 5 are arranged on a straight line parallel to the X axis. As illustrated in FIG. 4A, when a virtual plane 7 parallel to the XY planes are defined to include all the areas of the container unit model 3, the projection range of the projector model 6 on the virtual plane 7 includes all of the XY areas in the container unit model 3 and coincides with the view ranges of the camera models 5. In addition, when the needed measurement range is included in the fields of view of the two cameral models 5 and the projection range of the projector model 6, the view range and the projection range may not coincide with each other or a part of them may overlap each other. The virtual plane 7, for example, is set in the vicinity of the upper surface of the uppermost article model 2 arranged in the container unit model 3 (see FIG. 8). The virtual plane 7 may also be set at the bottom surface of the container unit model 3 or at a predetermined height from the bottom surface in parallel to the XY plane.

The obstacle arrangement unit 13 arranges an obstacle model obtained by modeling an obstacle which prevents position measurement by the range sensor 40. In other words, when there is an obstacle between the range sensor 40 and the article 20 facing the range sensor 40, the position measurement by the range sensor 40 is not possible. In consideration of this point, the obstacle model is arranged. In FIG. 1, the robot model 1 and the container unit model 3 correspond to the obstacle model.

Figure 5:
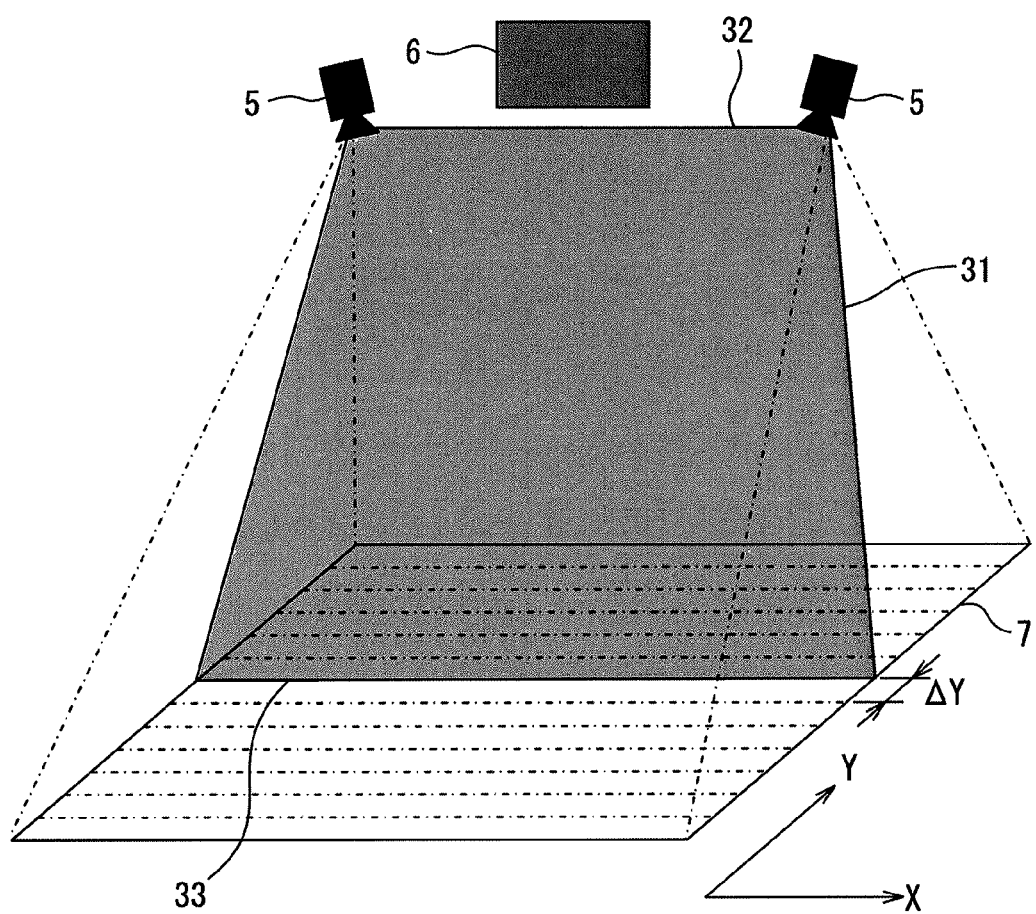
FIG. 5 is a diagram for explaining processing in a first plane group generation unit of FIG. 2.

The first plane group generation unit 14 generates a plurality of first planes for dividing the view range at a regular interval on the basis of the arrangement positions of the camera models 5. FIG. 5 is a diagram for explaining processing in the first plane group generation unit 14. As illustrated in FIG. 5, firstly, the first plane group generation unit 14 divides the virtual plane 7 opposing the pair of camera models 5 at a regular interval of a predetermined interval ΔY in parallel to a straight line 32 which is connected focuses of the pair of camera models 5 to each other, and sets a plurality of division lines 33 parallel to the X axis. At this time, a plurality of planes obtained by the straight line 32 and the division lines 33 are respectively defined as first planes 31, and a plurality of first planes 31 are called a first plane group. Each first plane 31 includes a camera sight line extending toward each division line 33 from the pair of camera models 5.

Figure 6:
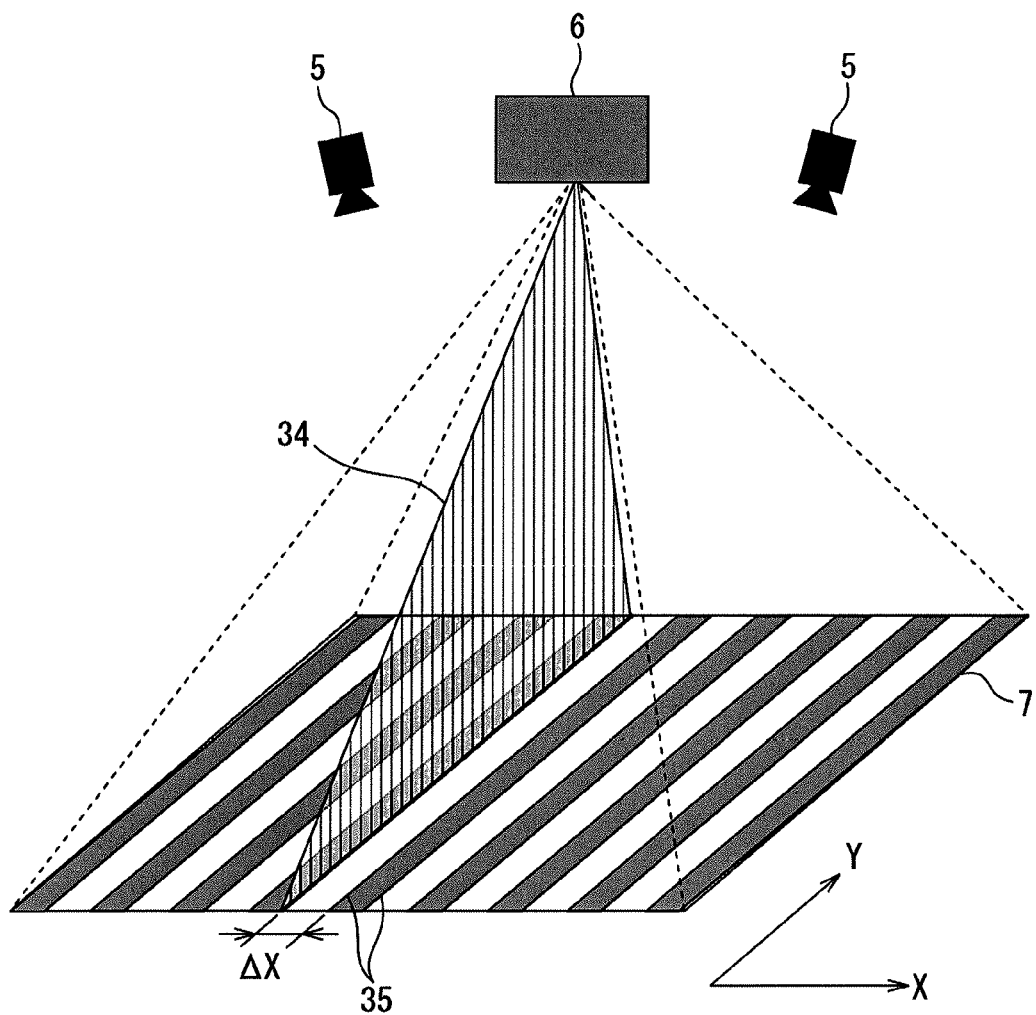
FIG. 6 is a diagram for explaining processing in a second plane group generation unit of FIG. 2.

The second plane group generation unit 15 generates second planes 34 on the basis of the arrangement position of the projector model 6. FIG. 6 is a diagram for explaining processing in the second plane group generation unit 15. As illustrated in FIG. 6, when it is assumed that strip pattern light has been projected to the virtual plane 7 from the projector model 6, the second planes 34 are generated along a boundary surface of the pattern light. A plurality of generated second planes 34 are referred to as a second plane group. The pattern light alternately generates patterns with light and shade of a predetermined width on the virtual plane 7 along the X axis. The light and shade patterns are defined by boundary lines 35 at which the second planes 34 and the virtual plane 7 intersect each other, and an interval ΔX between the boundary lines 35 is equal to and approximately equal to the interval ΔY between the division lines 33 of the first planes 31.

Figure 7A:
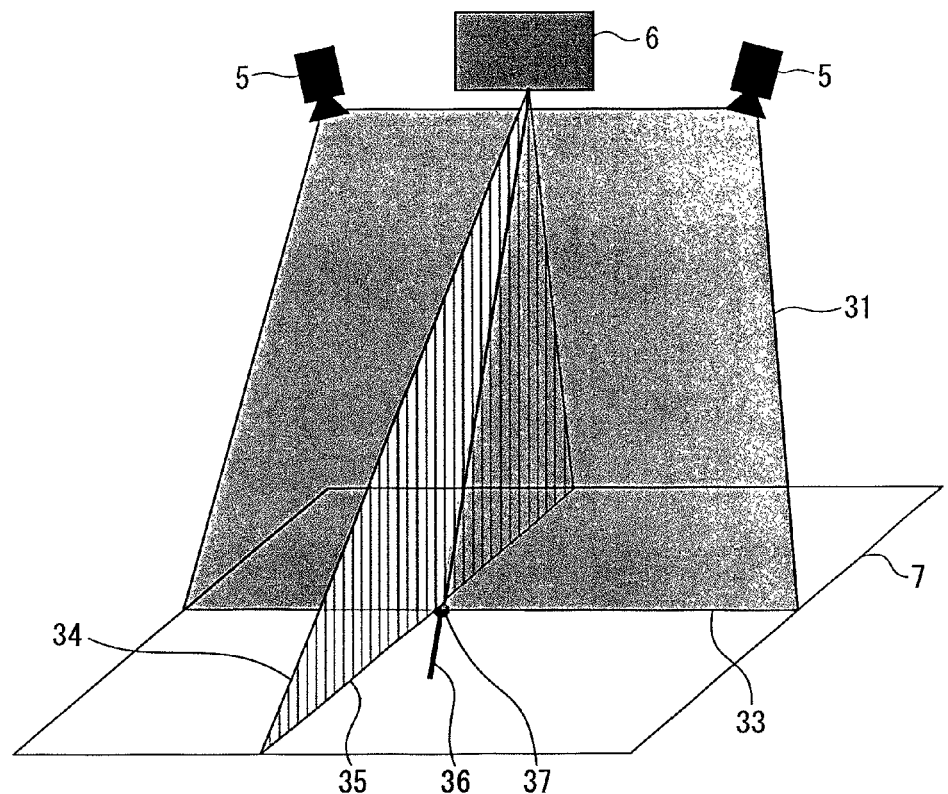
FIG. 7A and FIG. 7B are diagrams for explaining processing in an intersection line calculation unit of FIG. 2.
Figure 7B:
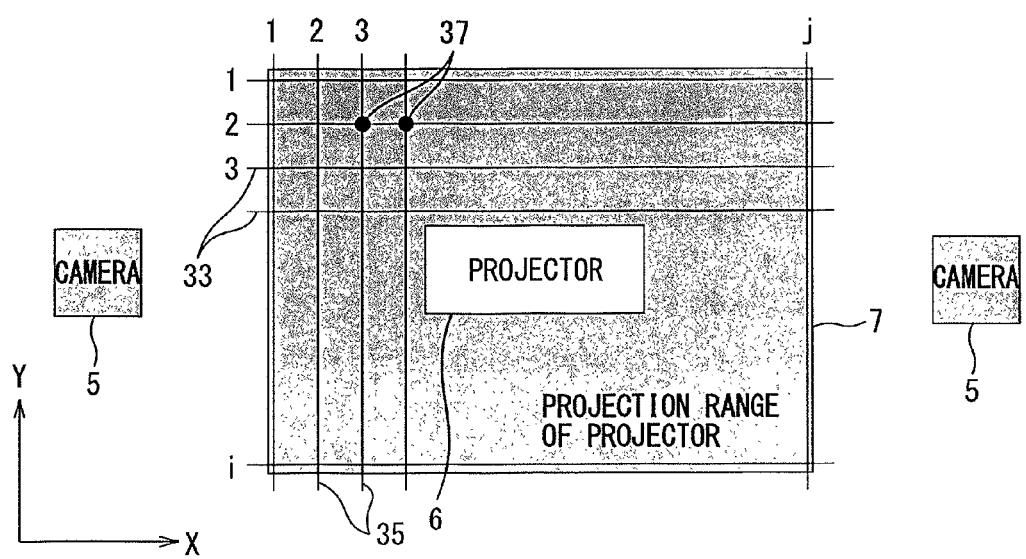

The intersection line calculation unit 16 calculates a plurality of intersection lines at which the plurality of first planes 31 and the plurality of second planes 34 intersect each other. FIG. 7A and FIG. 7B are diagrams for explaining processing in the intersection line calculation unit 16, wherein particularly, FIG. 7A illustrates a perspective view of the first plane 31 and the second plane 34 and FIG. 7B illustrates a plan view. As illustrated in FIG. 7A, the first plane 31 and the second plane 34 orthogonally intersect each other or almost orthogonally intersect each other, and an intersection line 36, at which the first plane 31 and the second plane 34 intersect each other, extends from the light projection part of the projector model 6. As illustrated in FIG. 7B, the division line 33 of an end portion of the first plane 31 and the boundary line 35 of an end portion of the second plane 34 intersect each other in a lattice shape, and the intersection line 36 passes through an intersection point 37 between the division line 33 and the boundary line 35.

Figure 8:
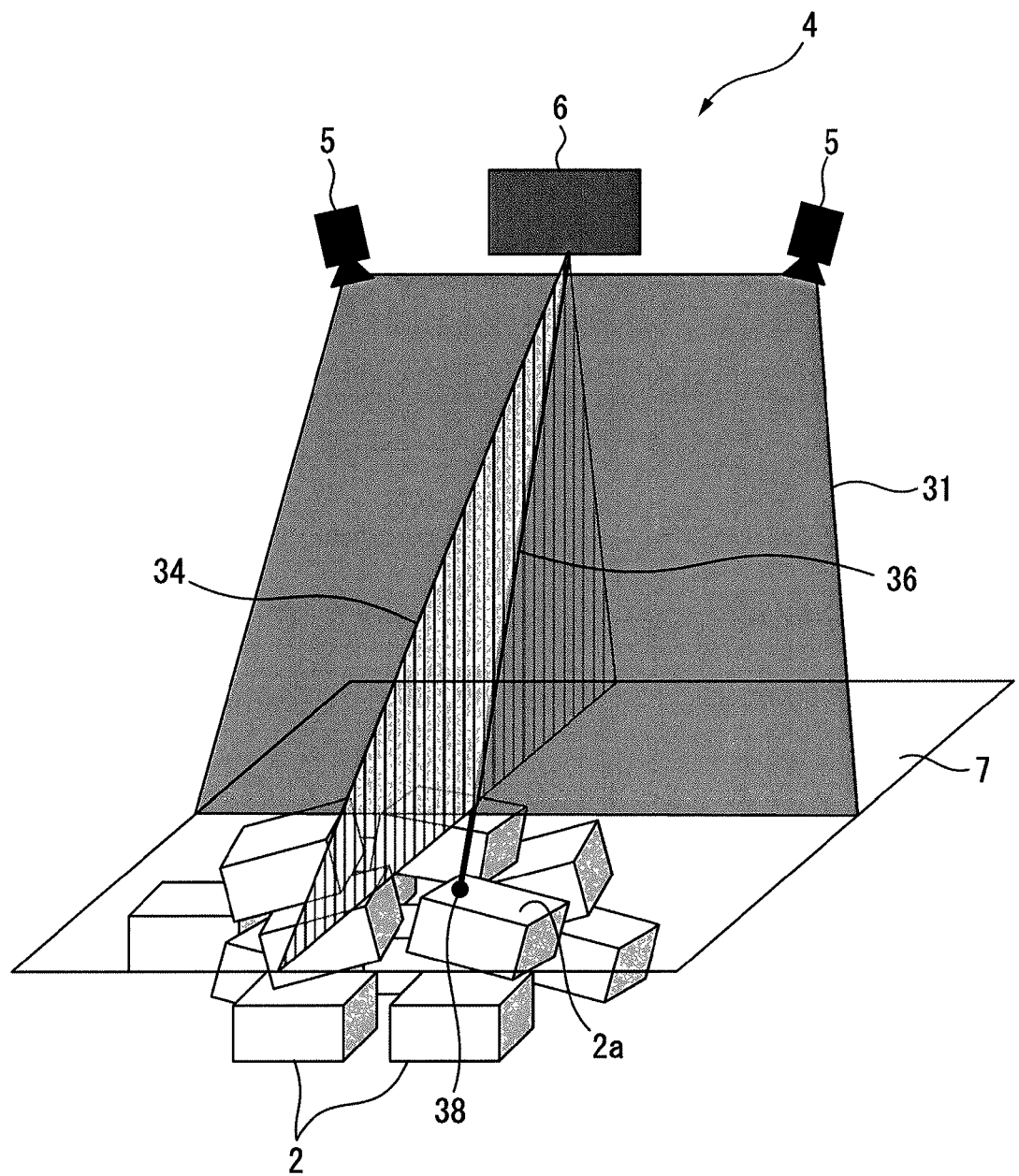
FIG. 8 is a diagram for explaining processing in an intersection number calculation unit of FIG. 2.

The intersection number calculation unit 17 counts the number of intersection points at which the intersection line 36 and surfaces 2a of the article models 2 intersect each other. The intersection point corresponds to a measurement point of the surface of the article by the range sensor 40, and many measurement points are obtained as the number of the intersection points is large. FIG. 8, FIG. 9, FIG. 10A, and FIG. 10B are diagrams for explaining processing in the intersection number calculation unit 17. As illustrated in FIG. 8, the intersection number calculation unit 17 firstly obtains an intersection point (a measurement point) 38 between the surface 2a of the article model 2 and the intersection line 36 facing the sensor model 4. In FIG. 8, the intersection line 36 extends by passing through the virtual plane 7 and the intersection point 38 is positioned below the virtual plane 7.

Figure 9:
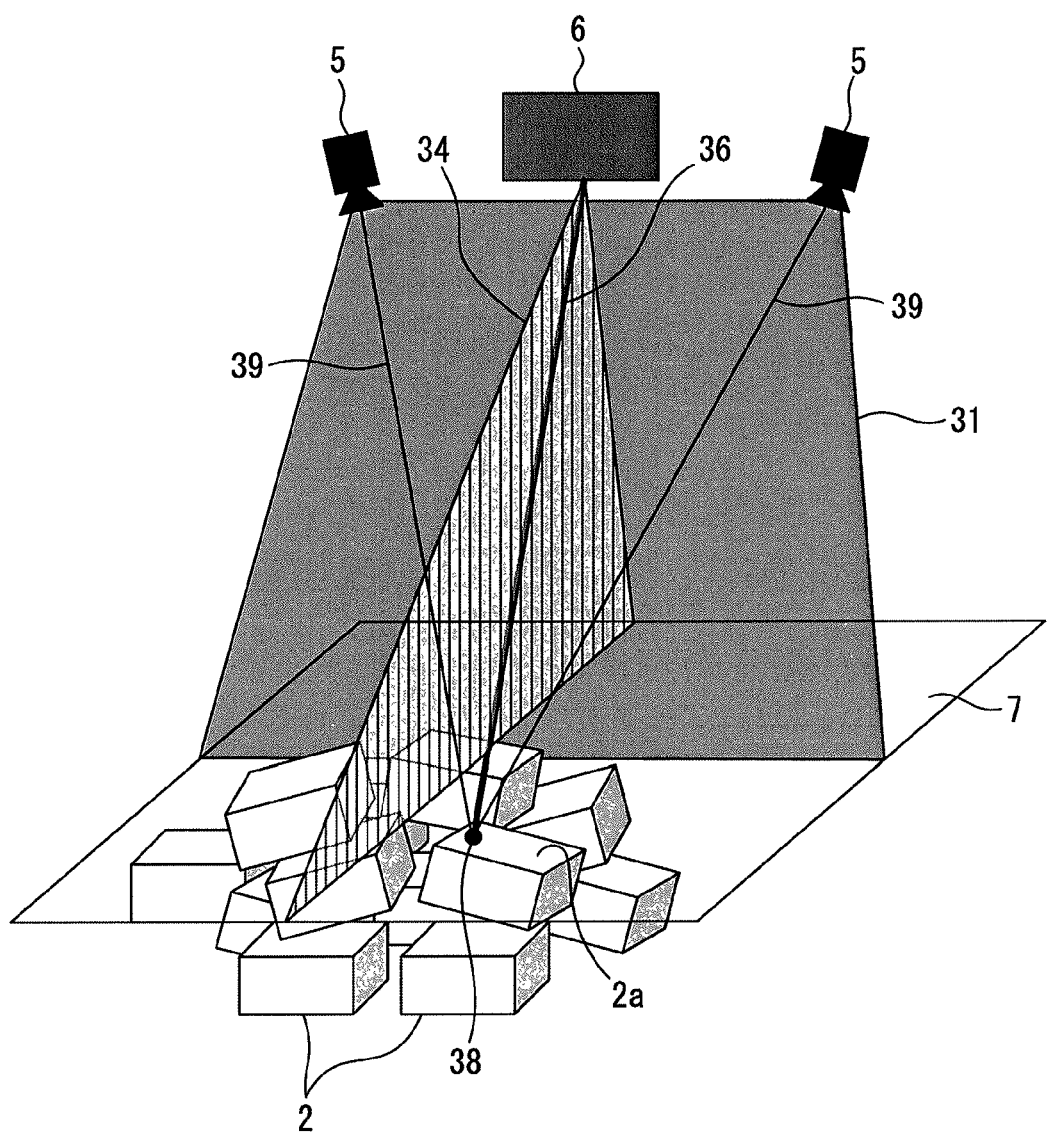
FIG. 9 is a diagram for explaining processing in an intersection number calculation unit of FIG. 2.

The "facing the sensor model 4" indicates the case in which another article model 2, the container unit model 3, and the robot model 1 do not exist on line segments 39 obtained by connecting the intersection point 38 to the focus of each camera model 5 by a straight line, as illustrated in FIG. 9. In other words, when the other article model 2 and the like exist on the line segments 39, since the camera sight line from the camera model 5 to the intersection point 38 is blocked, the camera 41 is not able to recognize the position of the intersection point 38. Consequently, in this case, the surface 2a of the article model 2 does not face the sensor model 4, and the intersection number calculation unit 17 does not count the intersection point 38. In other words, an effective intersection point 38 exists only on the surface 2a of the article model 2 through which the camera sight line (the line segment 39) starting from the camera model 5 initially passes. The intersection number calculation unit 17 calculates three-dimensional coordinate values (XYZ coordinate values) of a plurality of intersection points 38 obtained in this way, respectively.

Figure 10A:
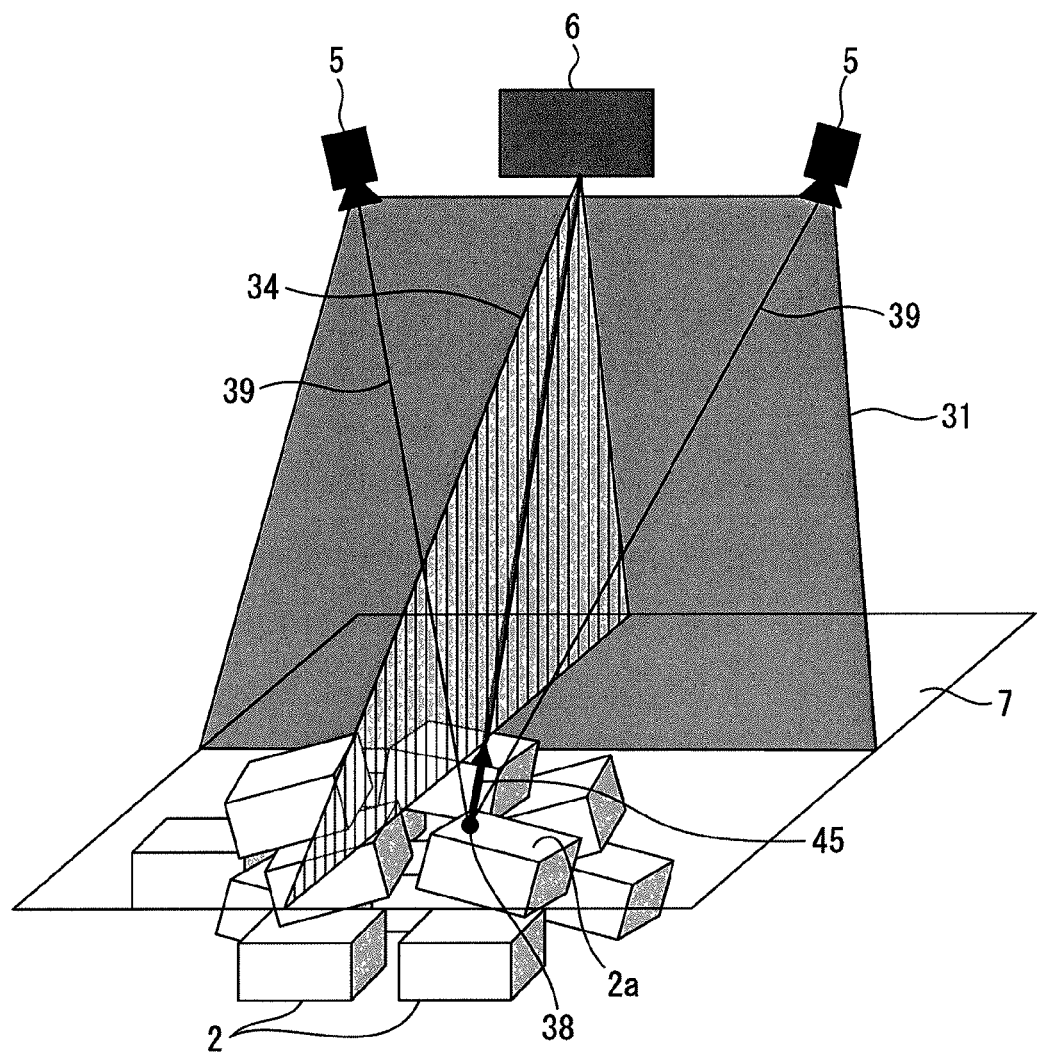
FIG. 10A and FIG. 10B are diagrams for explaining processing in an intersection number calculation unit of FIG. 2.
Figure 10B:
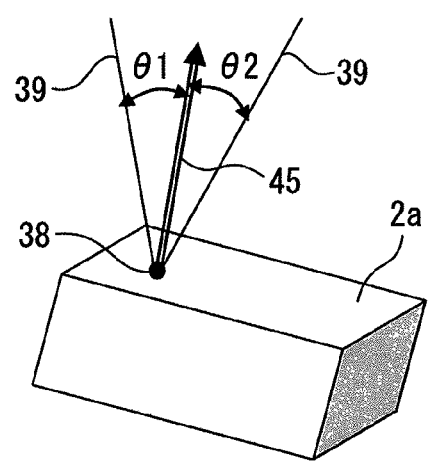

Then, as illustrated in FIG. 10A, on the basis of the shapes and orientations of the article models 2, the intersection number calculation unit 17 calculates a normal vector 45 perpendicular to the surface 2a of the article model 2 at the intersection point 38 and directed outward (to the sensor model 4 side) from the surface 2a. Moreover, as illustrated in FIG. 10B, it is judged that if angles θ1 and θ2 between the normal vector 45 and each line segment 39 are larger than an angle θa which is decided in advance. The θa is a threshold value for determining an effective intersection point and is set as a value (for example, 40° to 50°) smaller than 90°. In other words, when the angles θ1 and θ2 are excessively large, the camera 41 is not accurately able to recognize the position of an article surface. Consequently, when at least one of the angles θ1 and θ2 is larger than the θa, even though the surfaces 2a of the article models 2 face the sensor model 4, the intersection number calculation unit 17 does not put the intersection points 38 on the surfaces 2a into effective intersection points 38 and does not count the intersection points 38.

The arrangement evaluation unit 18 evaluates the propriety of the arrangement position of the sensor model 4 on the basis of the number of intersection points 38 counted by the intersection number calculation unit 17. For example, when the number of counted intersection points 38 is equal to or more than a predetermined number which is decided in advance, since the range sensor 40 can measure many three-dimensional points of the article surfaces, it is determined that the arrangement position of the sensor model 4 is proper. The arrangement evaluation unit 18 outputs a result of the determination to the output unit 102. In this way, a worker can decide an optimal arrangement position of the range sensor 40. In addition, the arrangement evaluation unit 18 may also output the three-dimensional coordinate values of the intersection points 38 calculated by the intersection number calculation unit 17 to the output unit 102. In this way, a user can estimate the position information of article surfaces obtained by the range sensor 40 by simulation in advance.

Figure 11:
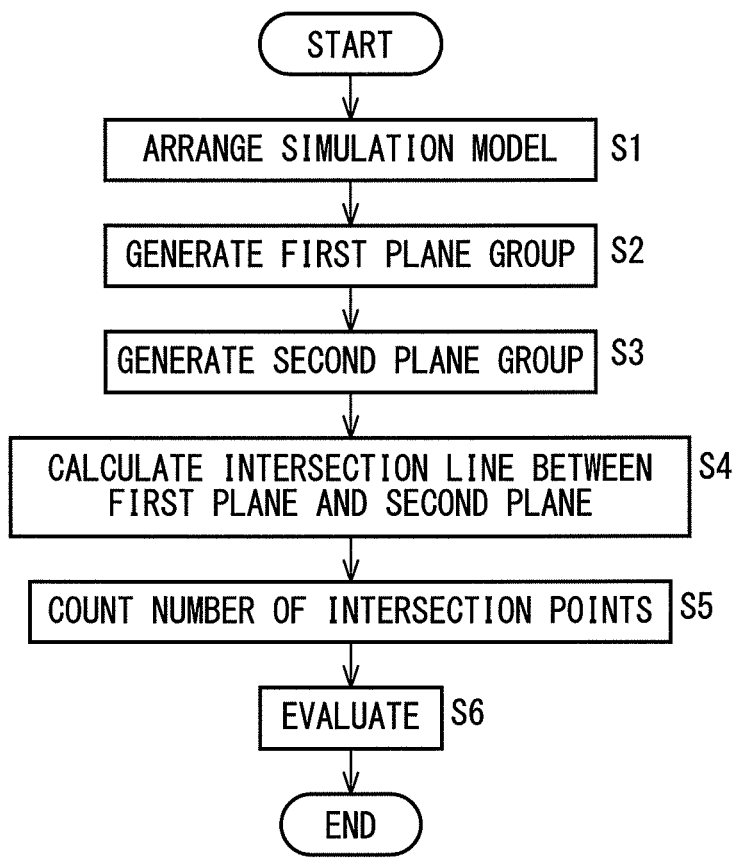
FIG. 11 is a flowchart which shows one example of processing performed by an arithmetic calculation unit of FIG. 2.

FIG. 11 is a flowchart illustrating one example of processing performed by the arithmetic calculation unit 10 of the arrangement evaluation apparatus 100 according to the first embodiment of the present invention. The processing indicated by the flowchart, for example, is started when a simulation start command is input via the input unit 101.

In step S1, by the processing in the article arrangement unit 11, the sensor arrangement unit 12, and the obstacle arrangement unit 13, the simulation models (the robot model 1, the article model 2, the container unit model 3, and the sensor model 4) are arranged in a three-dimensional virtual space. In step S2, by the processing in the first plane group generation unit 14, the plurality of first planes 31 (the first plane group) are generated on the basis of the arrangement position of the camera model 5 as illustrated in FIG. 5. In step S3, by the processing in the second plane group generation unit 15, the plurality of second planes 34 (the second plane group) are generated on the basis of the arrangement position of the projector model 6 as illustrated in FIG. 6. In step S4, by the processing in the intersection line calculation unit 16, the plurality of intersection lines 36, at which the plurality of first planes 31 and the plurality of second planes 34 intersect each other, are calculated as illustrated in FIG. 7A.

In step S5, by the processing in the intersection number calculation unit 17, the number of intersection points 38 between the intersection lines 36 and the surfaces 2a of the article models 2 facing the sensor model 4 is counted and three-dimensional coordinate values of the intersection points 38 are calculated as illustrated in FIG. 8. In this case, as illustrated in FIG. 10A and FIG. 10B, the line segments (the camera sight lines) 39 obtained by connecting the camera models 5 to the intersection points 38 and the angles θ1 and θ2 of the normal vector 45 with respect to the surfaces 2a of the article models 2 are calculated, and when the angles θ1 and θ2 are larger than the predetermined angle θa, the intersection points 38 are not counted. In step S6, by the processing in the arrangement evaluation unit 18, the propriety of the arrangement position of the sensor model 4 is evaluated on the basis of the number of counted intersection points 38, and the procedure is ended.

According to the first embodiment of the present invention, it is possible to achieve the following actions and effects.

(1) The arrangement evaluation apparatus 100 of a range sensor includes the article arrangement unit 11 that arranges the article models 2 in the predetermined area (in the container unit model 3) of the three-dimensional virtual space, the sensor arrangement unit 12 that arranges the sensor model 4 including a pair of camera models 5 and the projector model 6 in the virtual space so that the predetermined area is included in the measurement range, the first plane group generation unit 14 which generates the plurality of first planes 31 including the plurality of division lines 33 obtained by dividing the virtual plane 7 at a regular interval in the predetermined area facing the pair of camera models 5 and the straight line 32 connecting the focuses of the pair of camera models 5 to each other, the second plane group generation unit 15 that generates the plurality of second planes 34 by boundary surfaces of stripe pattern light when it is assumed that the pattern light has been projected from the projector model 6 to the virtual plane 7, the intersection line calculation unit 16 that calculates the plurality of intersection lines 36 between the plurality of first planes 31 and the plurality of second planes 34, and the intersection number calculation unit 17 that counts the number of the intersection points 38 between the plurality of intersection lines 36 and the surfaces 2a of the article models 2 facing the pair of camera models 5. The number of the intersection points 38 corresponds to the number of measurement points of the range sensor 40, and thus it is possible to obtain an optimal arrangement position of the range sensor 40.

(2) The intersection number calculation unit 17 counts, as an effective intersection point, an intersection point 38 at which the angles θ1 and θ2 between the straight lines (the line segments 39) connecting the intersection points 38 on the surfaces 2a of the article models 2 to the pair of camera models 5 and the normal vector 45 from the intersection point 38 on the surfaces 2a of the article models 2 are equal to or less than the predetermined angle θa. Consequently, positions on the article surfaces which are not accurately measurable by the range sensor 40 are not included in the number of the intersection points 38, and the propriety of the arrangement position of the range sensor 40 can be reliably evaluated by simulation.

(3) Since the arrangement evaluation apparatus 100 further has the obstacle arrangement unit 13 which arranges an obstacle model including the container unit model 3 and the intersection number calculation unit 17 counts the number of intersection points 38 at which there is no obstacle model between the camera models 5 and intersection points 38, when the camera sight lines from the camera models 5 to the intersection points 38 are blocked by the container unit model 3, the intersection points 38 are not counted, and the propriety of the arrangement position of the range sensor 40 can be accurately evaluated by simulation.

(4) The arrangement evaluation apparatus 100 further has the arrangement evaluation unit 18 that evaluates the arrangement position of the range sensor 40 on the basis of the number of the intersection points 38 counted by the intersection number calculation unit 17. In this case, the evaluation of the arrangement position of the range sensor 40 is performed regardless of the judgment of a user, so that it is possible to easily obtain an optimal arrangement position of the range sensor 40.

In this case, it is sufficient if the arrangement evaluation unit 18 sums the number of intersection points 38 counted with respect to respective arrangement patterns and evaluates the arrangement position of the range sensor 40 on the basis of the sum value. For example, as the sum value is large, it is evaluated that the arrangement of the range sensor 40 is proper. As described above, the number of the intersection points 38 is obtained with respect to a plurality of arrangement patterns of the article models 2 and the arrangement position of the range sensor 40 is evaluated on the basis of the sum value of the number of the intersection points 38, so that it is possible to reliably evaluate the arrangement position of the range sensor 40 with respect to the stacked articles 20.

(Second Embodiment)

Figure 12:
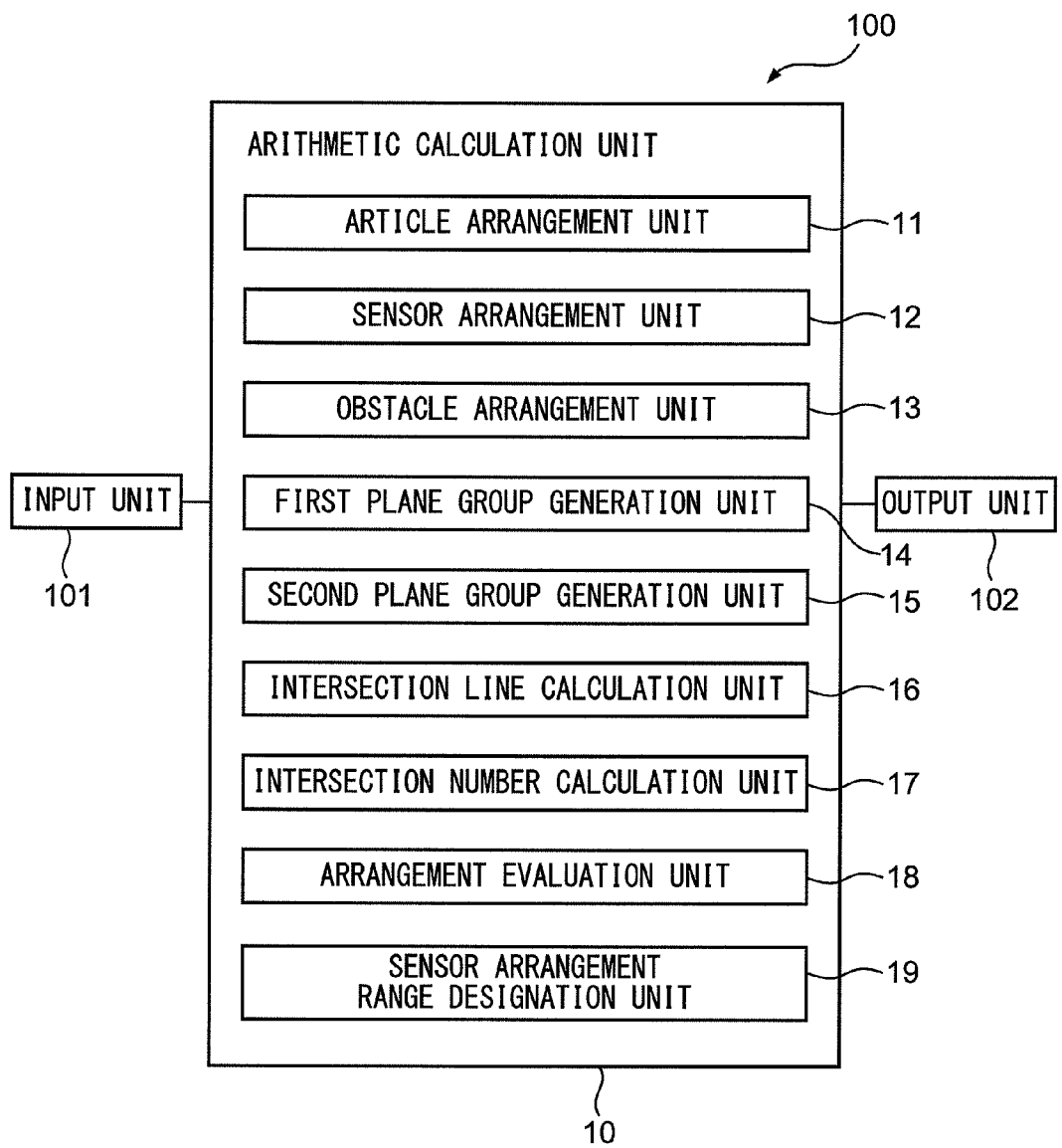
FIG. 12 is a block diagram illustrating a configuration of an arrangement evaluation apparatus of a range sensor according to a second embodiment of the present invention.
Figure 13:
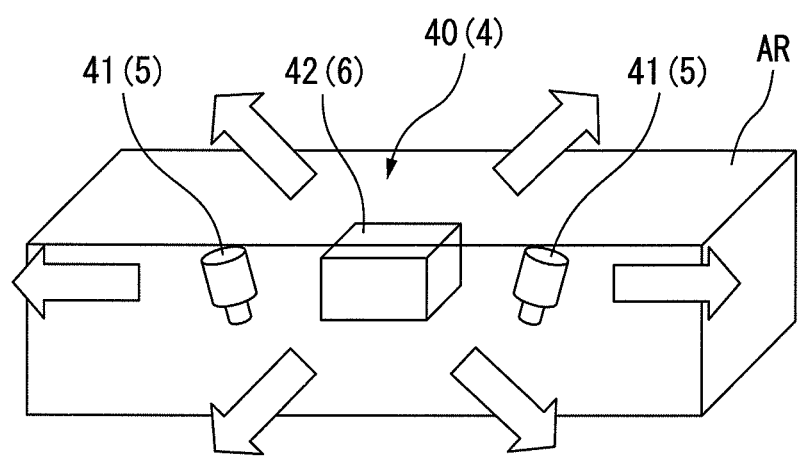
FIG. 13 is a diagram which shows an arrangement range of a range sensor according to a second embodiment of the present invention.
Figure 14:
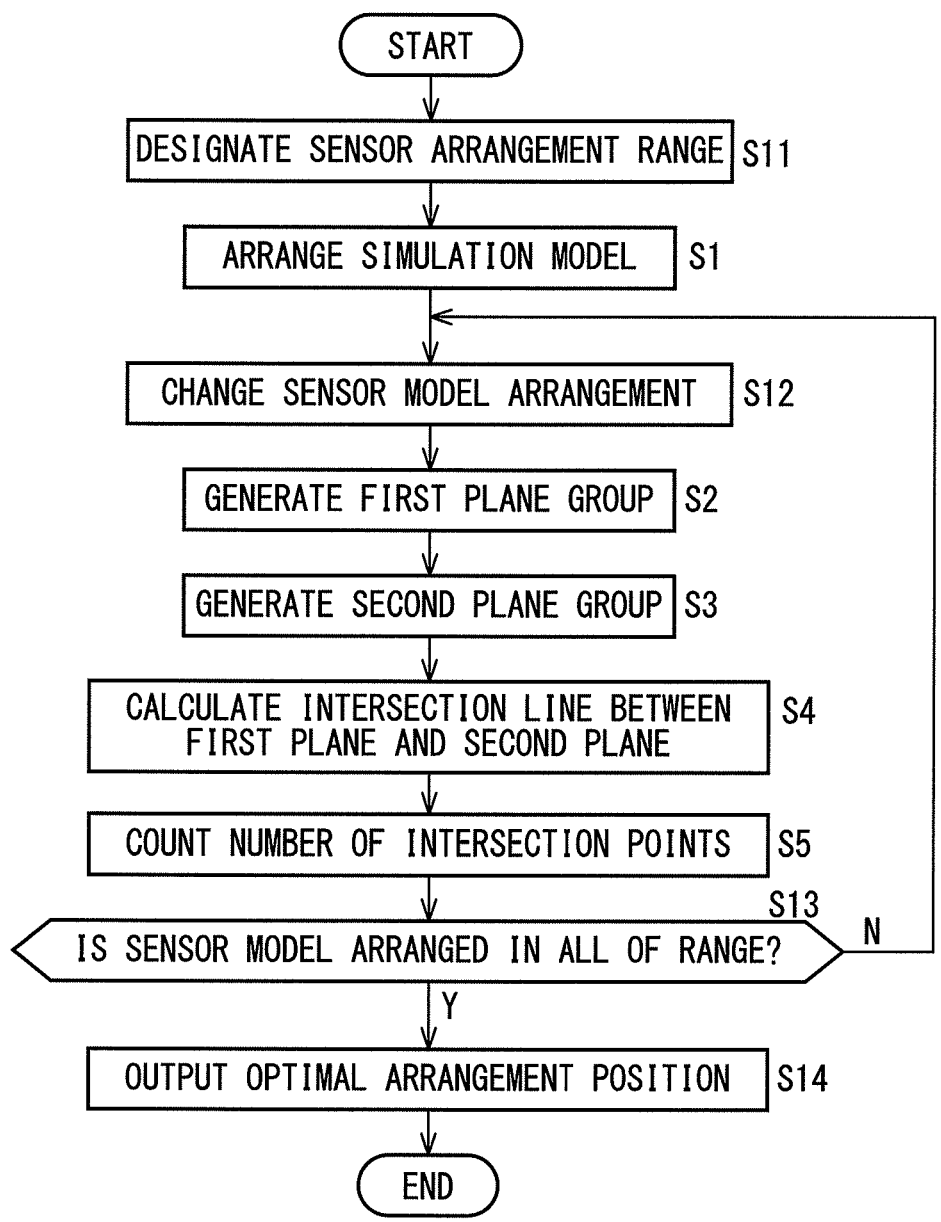
FIG. 14 is a flowchart which shows one example of processing performed by an arithmetic calculation unit of FIG. 12.

With reference to FIG. 12 to FIG. 14, a second embodiment of the present invention will be described. In the second embodiment, an optimal arrangement position of the range sensor 40 is automatically obtained. FIG. 12 is a block diagram illustrating a configuration of the arrangement evaluation apparatus 100 of a range sensor according to the second embodiment of the present invention. In addition, the same reference numerals are used to designate the same elements as those of FIG. 2, and a difference from FIG. 2 will be mainly described below.

As illustrated in FIG. 12, the arithmetic calculation unit 10 has a sensor arrangement range designation unit 19, which designates an arrangeable range (an arrangement range AR) of the range sensor 40, in addition to the aforementioned article arrangement unit 11, sensor arrangement unit 12, obstacle arrangement unit 13, first plane group generation unit 14, second plane group generation unit 15, intersection line calculation unit 16, intersection number calculation unit 17, and arrangement evaluation unit 18.

FIG. 13 is a diagram illustrating the arrangement range AR of the range sensor 40. The arrangement range AR is an arrangement range of the range sensor 40 capable of measuring surface positions of the articles 20, and for example, can be designated by a user through an operation of the input unit 101 in a three-dimensional virtual space above the container unit 30. The sensor arrangement unit 12 changes the arrangement position of the sensor model 4 in the designated arrangement range AR. For example, the sensor arrangement unit 12 moves the entire or a part (the camera model 5 and the projector model 6) of the sensor model 4 from a reference position illustrated in FIG. 13 in an arrow direction of FIG. 13 by a predetermined amount or changes an inclination angle of the sensor model 4 by a predetermined amount, thereby changing the arrangement position of the sensor model 4.

FIG. 14 is a flowchart illustrating one example of processing performed by the arithmetic calculation unit 10 of the arrangement evaluation apparatus 100 according to the second embodiment. In addition, the same reference numerals are used to designate the same parts performing the same processing as that of FIG. 11, and a difference from FIG. 11 will be mainly described below. In step S11, by the processing in the sensor arrangement range designation unit 19, the arrangement range AR of the sensor model 4 is designated. In step S12, by the processing in the sensor arrangement unit 12, the position or orientation of the sensor model 4, i.e., the arrangement of the sensor model 4 is changed in the designated arrangement range AR.

In step S5, on the basis of the changed position or orientation of the sensor model 4, the number of intersection points 38 is counted. Thereafter, in step S13, it is determined whether the sensor model 4 has been already arranged in all arrangeable positions of the sensor model 4 in the arrangement range AR, i.e., all the arrangeable positions of the sensor model 4 have been selected. When step S13 is negative, the procedure returns to step S12 and the arrangement of the sensor model 4 is changed to an unselected position or orientation of the sensor model 4. When step S13 is positive, the procedure proceeds to step S14 and by the processing in the arrangement evaluation unit 18, the arrangement position of the sensor model 4 in which the number of intersection points 38 is maximum is selected and is output to the output unit 102. In this way, it is possible to obtain an optimal arrangement position of the range sensor 40.

As described above, in the second embodiment, the sensor arrangement unit 12 arranges the sensor model 4 with a plurality of arrangement patterns, the intersection number calculation unit 17 counts the number of intersection points 38 with respect to respective arrangement patterns, and the arrangement evaluation unit 18 outputs an arrangement pattern of the sensor model 4 in which the number of the intersection points 38 is maximum. In this way, it is possible to automatically obtain an optimal arrangement position of the range sensor 40 and optimal position measurement of article surfaces by the range sensor 40 becomes possible. Furthermore, the arrangement evaluation apparatus 100 further includes the sensor arrangement range designation unit 19, which designates the arrangement range AR of the sensor model 4 and the sensor arrangement unit 12 changes the arrangement patterns of the sensor model 4 in the arrangement range designated by the sensor arrangement range designation unit 19, so that it is possible to easily and optimally change the arrangement patterns of the sensor model 4.

In addition, in the first embodiment and the second embodiment, by the processing in the article arrangement unit 11, the article models 2 are stacked and arranged in the three-dimensional virtual space. However, when the articles 20 are stacked and arranged, there is no regularity in the positions or orientations of the articles 20 and various arrangement patterns are considered. In this regard, the article arrangement unit 11 may be configured to arrange the article models 2 with a plurality of arrangement patterns, and the intersection number calculation unit 17 may be configured to count the number of intersection points with respect to respective arrangement patterns. In the case of arranging the article models 2 with the plurality of arrangement patterns, it is sufficient if the positions and orientations of the article models 2 of FIG. 3A are changed through the operation of the input unit 101 by a user. The article arrangement unit 11 may automatically change the arrangement patterns of the article models 2 of FIG. 3A according to predetermined rules.

In the embodiments, the arrangement evaluation unit 18 is configured to determine whether the arrangement position of the sensor model 4 is proper on the basis of the number of the intersection points 38 counted by the intersection number calculation unit 17, and to output the determination result to the output unit 102. In other words, the arrangement evaluation unit 18 is configured to evaluate the arrangement position of the sensor model 4. However, the arrangement evaluation unit 18 may be omitted, and the number of the intersection points 38 counted by the intersection number calculation unit 17 may be configured to be output to the output unit 102 as is.

According to the present invention, by using a sensor model corresponding to a range sensor and an article model corresponding to stacked articles, a simulation is performed to count the number of intersection points of article model surfaces corresponding to measurement points of the range sensor, and therefore it is possible to obtain an optimal arrangement position of the range sensor by simulation.

The above description is merely an example, and the present invention is not limited to the aforementioned embodiments and modifications as long as they do not impair the features of the present invention. Elements of the embodiments and the modifications include elements which can be replaced and are apparently replaced while maintaining the identification of the present invention. In other words, other embodiments considered within the technical scope of the present invention are included in the scope of the present invention. Furthermore, the above embodiments and one or more the modifications can also be arbitrarily combined.

The invention claimed is:

1. An arrangement evaluation apparatus of a range sensor which evaluates by simulation an arrangement position of a range sensor having a pair of cameras and a projector for projecting a stripe pattern light, comprising:
    an article arrangement unit which arranges an article model corresponding to a plurality of stacked articles in a predetermined area in a three-dimensional virtual space;
    a sensor arrangement unit which arranges a sensor model, which is a sensor model corresponding to the range sensor and includes a pair of camera models corresponding to the pair of cameras and a projector model corresponding to the projector, in the virtual space so that the predetermined area is included in a measurement range;
    a first plane group generation unit which generates a plurality of first planes including a plurality of division lines obtained by dividing a virtual plane at a regular interval in the predetermined area opposing the pair of camera models and a camera sight line extending toward the respective division lines from the pair of camera models;
    a second plane group generation unit which generates a plurality of second planes by boundary surfaces of stripe pattern light when it is assumed that the stripe pattern light has been projected from the projector model to the virtual plane;
    an intersection line calculation unit which calculates a plurality of intersection lines at which the plurality of first planes and the plurality of second planes intersect each other;
    an intersection number calculation unit which counts a number of intersection points between the plurality of intersection lines and a surface of the article model facing the pair of camera models; and
    an arrangement evaluation unit which evaluates an arrangement position of the sensor model on the basis of the number of the intersection points counted by the intersection number calculation unit.

2. The arrangement evaluation apparatus of a range sensor according to claim 1, wherein the intersection number calculation unit counts a number of intersection points at which an angle between a straight line connecting the intersection point on the surface of the article model to the pair of cameral models and a normal line with respect to the surface of the article model passing through the intersection point is equal to or less than a predetermined angle.

3. The arrangement evaluation apparatus of a range sensor according to claim 1, further comprising: an obstacle arrangement unit which arranges an obstacle model including a container unit model corresponding to a container unit for receiving the articles, wherein the intersection number calculation unit counts a number of intersection points at which the obstacle model does not exist between the camera models and the intersection points.

4. The arrangement evaluation apparatus of a range sensor according to claim 1, wherein
   the article arrangement unit arranges the article model with a plurality of arrangement patterns,
   the intersection number calculation unit counts the number of the intersection points with respect to respective arrangement patterns, and
   the arrangement evaluation unit evaluates the arrangement position of the sensor model on the basis of a sum value obtained by summing the number of intersection points counted with respect to the respective arrangement patterns.

5. The arrangement evaluation apparatus of a range sensor according to claim 1, wherein the sensor arrangement unit arranges the sensor model with the plurality of arrangement patterns, the intersection number calculation unit counts the number of the intersection points with respect to the respective arrangement patterns, and the arrangement evaluation unit outputs an arrangement pattern of the sensor model in which the number of the intersection points is maximum.

6. The arrangement evaluation apparatus of a range sensor according to claim 5, further comprising a sensor arrangement range designation unit which designates an arrangement range of the sensor model, wherein the sensor arrangement unit changes the arrangement pattern of the sensor model in an arrangement range designated by the sensor arrangement range designation unit.

* * * * *